US009522999B2

(12) United States Patent
Fouchet et al.

(10) Patent No.: US 9,522,999 B2
(45) Date of Patent: Dec. 20, 2016

(54) POLYMER LATEX WITH IMPROVED MECHANICAL PROPERTIES AND PROCESS FOR PREPARING SAID POLYMER LATEX

(75) Inventors: Bernard Fouchet, Strasbourg (FR); Etienne Lazarus, Marienthal (FR); Nicolas Tissier, Strasbourg (FR); Ursula Seiler, Bühl (DE); Donato Ventresca, Petrolia (CA)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 14/343,502

(22) PCT Filed: Aug. 23, 2012

(86) PCT No.: PCT/EP2012/066457
§ 371 (c)(1),
(2), (4) Date: May 12, 2014

(87) PCT Pub. No.: WO2013/034451
PCT Pub. Date: Mar. 14, 2013

(65) Prior Publication Data
US 2014/0309369 A1 Oct. 16, 2014

(30) Foreign Application Priority Data

Sep. 7, 2011 (EP) .................................. 11180369

(51) Int. Cl.
| | |
|---|---|
| *C08L 47/00* | (2006.01) |
| *C08L 33/08* | (2006.01) |
| *C08L 33/20* | (2006.01) |
| *C08F 212/08* | (2006.01) |
| *D21H 19/58* | (2006.01) |
| *D06N 7/00* | (2006.01) |
| *C08F 236/10* | (2006.01) |
| *C08F 220/06* | (2006.01) |
| *C08F 220/44* | (2006.01) |
| *C08F 222/02* | (2006.01) |

(52) U.S. Cl.
CPC .............. *C08L 47/00* (2013.01); *C08F 212/08* (2013.01); *C08F 236/10* (2013.01); *C08L 33/08* (2013.01); *C08L 33/20* (2013.01); *D06N 7/0073* (2013.01); *D21H 19/58* (2013.01); *C08F 220/06* (2013.01); *C08F 220/44* (2013.01); *C08F 222/02* (2013.01); *D06N 2203/047* (2013.01)

(58) Field of Classification Search
CPC ............ C08L 47/00; C08L 33/20; C08L 33/08
USPC ....................... 524/828, 832, 836
See application file for complete search history.

(56) References Cited

U.S. PATENT DOCUMENTS

| | | | |
|---|---|---|---|
| 2,569,506 | A | 10/1951 | Vandenberg |
| 2,776,295 | A | 1/1957 | Wicklatz et al. |
| 3,243,399 | A | 3/1966 | Knapp et al. |
| 3,563,946 | A | 2/1971 | Miller et al. |
| 3,575,913 | A | 4/1971 | Meier |
| 4,478,974 | A | 10/1984 | Lee et al. |
| 4,751,111 | A | 6/1988 | Lee et al. |
| 4,968,740 | A | 11/1990 | Makati et al. |
| 5,837,762 | A | 11/1998 | Stollmaier et al. |
| 6,590,022 | B1 | 7/2003 | Bastelberger et al. |
| 2003/0138519 | A1 | 7/2003 | Hill et al. |
| 2011/0166264 | A1 | 7/2011 | Parikh et al. |

FOREIGN PATENT DOCUMENTS

| | | |
|---|---|---|
| BE | 620064 | 11/1962 |
| CN | 1865301 A | 11/2006 |
| CN | 101130612 A | 2/2008 |
| DE | 1 905 256 | 9/1969 |
| EP | 1 380 597 A1 | 1/2004 |
| EP | 2 085 409 A1 | 8/2009 |
| GB | 1 245 166 | 9/1971 |
| SU | 432159 | 6/1974 |
| WO | WO 98/54250 | 12/1998 |
| WO | WO 99/28360 | 6/1999 |
| WO | WO 2011/079011 A2 | 6/2011 |

OTHER PUBLICATIONS

PCT/EP2012/066457 International Search Report dated Oct. 9, 2012 (3 pages).
Walling et al., *Journal of the American Chemical Society* (1954), 76 4878-83.
Indictor et al., *Journal of Polymer Science, Part A-1: Polymer Chemistry* (1967), 5(5), 1101-6.
Wallace et al., *Journal of Polymer Science, Part A-1: Polymer Chemistry* (1966), 4(1), 71-82.

(Continued)

*Primary Examiner* — James J Seidleck
*Assistant Examiner* — Deve E Valdez
(74) *Attorney, Agent, or Firm* — Eric D. Babych; Brinks Gilson & Lione

(57) ABSTRACT

The present invention relates to a process for preparing a polymer latex that includes polymerizing one or more ethylenically unsaturated aromatic monomers and one or more conjugated diene monomers in the presence of a hydroperoxide chain transfer agent and sulfur-containing chain transfer agent, wherein the sulfur-containing chain transfer agent is added after the hydroperoxide chain transfer agent. It further relates to the polymer latex thus obtained, to a composition comprising the polymer latex and to the use of the polymer latex or polymer latex composition in a carpet backing, paper coating, or fiber fabric pre-impregnation process.

9 Claims, 1 Drawing Sheet

(56) References Cited

OTHER PUBLICATIONS

Kutsenok et al., *Vysokomolekulyarnye Soedineniya* (1959), 1 1830-9.
Puchin et al., *Lvov Polytechnic Institute* U.S.S.R. (1974).
Yurzhenko et al., *Doklady Akademii Nauk SSSR* (1953), 92 97-100.
Dinges et al., *Farbenfabriken Bayer A.-G.*). (1962), 15 pp. Notification of the Second Office Action for corresponding Chinese Patent Application No. 201280042896.9, dated Sep. 9, 2015 (23 pages).
Yincheng, Qi, "Study of Emulsion Polymerization of Butadiene-Styrene in the Presence of a Highly Effective Initiator System," *Petrochemical Technology* 17(4):230-234 (Apr. 1988) with English abstract.

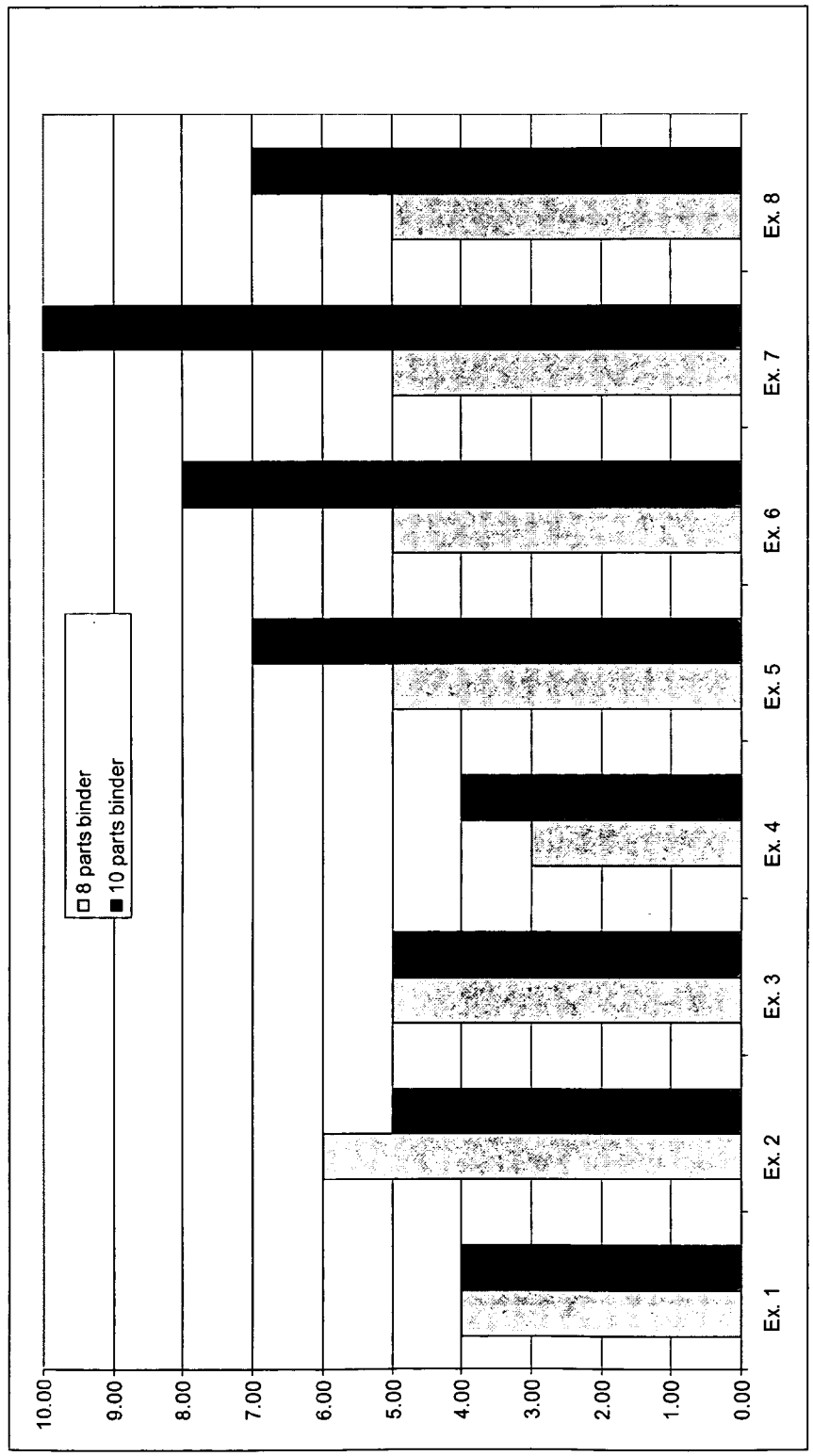

POLYMER LATEX WITH IMPROVED MECHANICAL PROPERTIES AND PROCESS FOR PREPARING SAID POLYMER LATEX

This application claims priority to International Application No. PCT/EP2012/066457 filed Aug. 23, 2012; and to European Application No. 11180369.8 filed Sep. 7, 2011, the entire contents of each are incorporated herein by reference.

FIELD OF THE INVENTION

The present invention relates to a process for preparing a polymer latex having improved mechanical properties when used in formulated coatings, in particular paper and paperboard coatings, a carpet backing or a fiber fabric pre-impregnation process. The present invention also relates to the polymer latex obtainable by the process of the invention and to a polymer latex composition comprising the polymer latex. The polymer latex of the invention is especially useful as a binder in a carpet backing and in a coating for surfaces to be printed on, for example in a paper coating.

BACKGROUND OF THE INVENTION

It is known to use polymer latexes as a constituent of coating compositions for coating surfaces to be printed on, e.g., in an offset printing process. One type of composition typically used for paper coating applications of this general kind is styrene/butadiene (SB) copolymer latexes prepared by polymerization of styrene and 1,3-butadiene. For improving printability, acrylates such as butyl acrylate are typically incorporated into the composition. In particular, compositions in paper coating applications are desired to provide good binding properties, such as wet and dry binding strength, as well piling resistance to hold multiple printing stations ink-paper surface splitting forces during commercial offset printing process, and a balanced application profile of paper gloss, ink gloss and ink set-off properties.

Polymer latexes are also used as a binder component in carpet backsizing composition. In this type of application, the backsizing needs to provide high tuft bind, high secondary backing adhesion, and retention of strength on exposure to moisture while being flexible for ease of carpet installation and carpet pattern matching.

Organic peroxides such as alkyl peroxides and redox pairs are known in the art to be used as polymerization initiators in polymer latex compositions (see, e.g., U.S. Pat. No. 5,837,762). Further, for controlling the molecular weight of the polymer molecules, it is known in the art to add so-called chain transfer agents, for instance sulfur-containing compounds such as mercaptans (cf. EP 2 085 409). Hydroperoxides are also described in the art as substitutes for mercaptan chain transfer agents for addressing odor issues (see, e.g., EP 1 380 597).

U.S. Pat. No. 2,569,506 describes the emulsion polymerization of vinyl compounds using in combination a mercaptan modifier, a hydroperoxide catalyst, and oxygen. The authors further use an "activating salt" as a redox system.

SUMMARY OF THE INVENTION

In accordance with the present invention, it has been found that the combination of a hydroperoxide chain transfer agent and a sulfur-containing chain transfer agent allows the polymerization of ethylenically unsaturated aromatic monomer and conjugated diene monomer to provide a polymer latex with improved mechanical properties, such as high elongation at break in association with high tensile strength at break. At the same time, such properties of the polymer latex result in superior binding effects when the polymer latex is used in a paper coating composition. Other applications which benefit from the specific combination of hydroperoxide and sulfur-containing chain transfer agents include carpet backing and paper and fiber fabric pre-impregnation processes. Without wishing to be bound by theory, it is considered that the hydroperoxides and sulfur-containing compounds act as a combined chain transfer agent, which exhibits combined medium and high efficiency chain transfer activities to produce a polymer having high elongation and tensile strength at break.

Since the activities of the hydroperoxide and sulfur-containing chain transfer agents have a direct impact on the molecular weight and polymer structure of the resulting polymer latex, the present invention also provides a novel polymer latex which is obtainable by the process of the invention and which is characterized by the product properties resulting from the specific use of the combined chain transfer agents.

BRIEF DESCRIPTION OF THE DRAWING

FIG. 1 depicts the binding strength of coated paper containing 8 or 10 parts by weight of the latexes of examples 1 to 7. The ink piling test simulates multiple printing station stress and resistance of the coating to surface picking. The higher the number of passes, the higher the binding strength.

DETAILED DESCRIPTION OF THE INVENTION

In a first aspect, the present invention provides a process for preparing a polymer latex comprising polymerizing one or more ethylenically unsaturated aromatic monomers and one or more conjugated diene monomers in the presence of hydroperoxide chain transfer agent and sulfur-containing chain transfer agent, wherein the sulfur-containing chain transfer agent is added after the hydroperoxide chain transfer agent.

The hydroperoxide chain transfer agent used in the invention can be hydrogen peroxide or an organic hydroperoxide having the general structure ROOH, wherein R is an organic residue. Examples of useful organic hydroperoxides are tert-amyl hydroperoxide, tert-butyl hydroperoxide, cumene hydroperoxide, diisopropylbenzene hydroperoxide and pinane hydroperoxide. Tert-butyl hydroperoxide is preferably used as the hydroperoxide chain transfer agent in the present invention. In the invention, two or more hydroperoxides may be used in combination as the hydroperoxide chain transfer agent. The hydroperoxide chain transfer agent is typically used in a total amount of 0.5 to 10 parts by weight, preferably 0.5 to 8 parts by weight, more preferably 0.5 to 4 parts by weight, based on 100 parts by weight of the total amount of monomers.

The sulfur-containing chain transfer agent used in the invention can be a mercaptan compound, especially an alkyl mercaptan such as methyl mercaptan, ethyl mercaptan, tert-butyl mercaptan, benzyl mercaptan, tert-nonyl mercaptan, n-octyl mercaptan, n-dodecyl mercaptan and tert-dodecyl mercaptan, a thioglycolic acid or thioglycolic acid ester, such as iso-octyl thioglycolate and 2-ethylhexyl thioglycolate, thiopropionic acid such as iso-octyl mercaptopropionic acid or a dithio compound such as 1,8-dimercapto-3,5-dioxaoctane. Tert-dodecyl mercaptan is preferably used as the sulfur-containing chain transfer agent in the present invention. In the invention, two or more sulfur-containing compounds may be used in combination as the sulfur-containing chain transfer agent. The sulfur-containing chain transfer agent is typically used in a total amount of 0.1 to 10 parts by weight, preferably 0.1 to 5 parts by weight and more preferably 0.1 to 2 parts by weight, based on 100 parts by weight of the total amount of monomers.

A combination of tert-butyl hydroperoxide and tert-dodecyl mercaptan is a preferred combination of chain transfer agents used in the present invention.

The polymer latex of the present invention is prepared from a monomer mixture which contains one or more ethylenically unsaturated aromatic monomers and one or more conjugated diene monomers, and which may optionally contain further polymerizable monomers (also referred to as comonomers) such as monofunctional or multifunctional acrylic and methacrylic acids and corresponding acrylate and methacrylate monomers.

The one or more ethylenically unsaturated aromatic monomers are typically used in a total amount of 10 to 90 wt %, more preferably 25 to 75 wt %, even more preferably 30 to 70 wt %, based on the total amount of monomers (including comonomers). Representative ethylenically unsaturated aromatic monomers include, for example, styrene, α-methyl styrene, p-ethyl styrene, p-methyl styrene, tert-butyl styrene, vinyl toluene and $C_{1-4}$ alkyl, chloro and bromo derivatives thereof. A particularly preferred ethylenically unsaturated aromatic monomer is styrene.

The one or more conjugated diene monomers are typically used in a total amount of 10 to 80 wt %, more preferably 20 to 80 wt %, even more preferably 20 to 70 wt %, even more preferably 25 to 60 wt %, based on the total amount of monomers. Representative conjugated diene monomers include, for example, 1,3-butadiene, isoprene, 2-methyl-1,3-butadiene, 2,3-dimethyl-1,3-butadiene and chlorinated butadiene. A particularly preferred conjugated diene monomer is 1,3-butadiene (also abbreviated as butadiene).

A combination of styrene and butadiene is a preferred combination of monomers in the present invention, preferably used in the respective amounts as indicated to be preferred above.

Further polymerizable monomers (comonomers) may be used as monomers to be polymerized in the preparation of the polymer latex of the present invention. Two or more of such further comonomers may be used in combination.

Examples of such comonomers include acrylate monomers, and two or more acrylate monomers may be used in combination. Representative examples of the acrylate monomers include, for example, n-, iso- and tert-alkyl esters of acrylic or methacrylic acid, wherein the alkyl group has from 1 to 20 carbon atoms. Additionally, acrylate monomers can include acids, esters, amides of the (meth)acrylic acid, and substituted derivatives thereof. Generally, preferred acrylate monomers are $C_1$-$C_{20}$ alkyl(meth)acrylates and $C_1$-$C_{10}$ alkoxy $C_1$-$C_{10}$ alkyl(meth)acrylates, more preferably $C_1$-$C_8$ alkyl(meth)acrylates and $C_1$-$C_8$ alkoxy $C_1$-$C_8$ alkyl (meth)acrylates. Examples of such acrylate monomers include n-butyl acrylate, sec-butyl acrylate, ethyl acrylate, hexyl acrylate, tert-butyl acrylate, 2-ethylhexyl acrylate, iso-octyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate, and cetyl methacrylate, methoxyethyl methacrylate, ethoxyethyl methacrylate, methoxyethyl acrylate, ethoxyethyl acrylate, butoxyethyl methacrylate, methoxybutyl acrylate and methoxyethoxyethyl acrylate. Preferred acrylate monomers are n-butyl acrylate, butyl methacrylate, 2-ethylhexyl acrylate, methyl acrylate and methyl methacrylate, with methyl methacrylate and n-butyl acrylate being especially preferred. Typically, the amount of acrylate monomer (if used) will be from 0 to 70 wt %, preferably from 0 to 60 wt %, even more preferably from 0 to 50 wt %, based on the total amount of the monomers.

Further examples of such comonomers include ethylenically unsaturated mono- and di-carboxylic acid monomers such as (meth)acrylic acid, fumaric acid, maleic acid and itaconic acid, nitrile monomers such as acrylonitrile, vinyl ester monomers, hydroxyalkyl-(meth)acrylate monomers, alkoxyalkyl(meth)acrylate monomers, and (meth)acrylamide monomers. A particularly preferred comonomer is acrylonitrile, preferably used in an amount of at least 2 wt %, more preferably at least 3 wt %, even more preferably at least 4 wt %. In terms of ranges, preferred amounts are 2 to 25 wt %, more preferably 3 to 20 wt %, even more preferably 4 to 12 wt %. It has been found that acrylonitrile has a particularly profound effect on the effectiveness of the combined, sequential use of the charge transfer agents in the process of the present invention and on the properties of the resulting polymer latex.

Further comonomers useful in the present invention are crosslinkers and include crosslinkable monomers, such as multi-ethylenically unsaturated monomers. Exemplary crosslinkers include N-methylol acrylamide, N-methylol methacrylamide, glycidyl acrylate, glycidyl methacrylate, ethylene glycol dimethacrylate, allyl methacrylate, diallyl maleate, propylene glycol dimethacrylate, divinylbenzene; and acryloxy alkylsilanes, such as, for example, α-acryloxypropyl trimethoxysilane. Preferred crosslinkable monomers for use in the present invention are allyl methacrylate, glycidyl methacrylate, and acryloxy alkylsilanes. These crosslinkable monomers, if used, are typically employed at levels of from 0.05 to 10, preferably 0.05 to 5 wt %, more preferably 0.05 to 2 wt %, based on the total amount weight of monomers.

In one preferred embodiment of the present invention, the polymer latex is prepared from at least styrene, butadiene and acrylonitrile, preferably used in the respective amounts as indicated to be preferred above.

Initiators useful in the practice of the present invention include water-soluble and/or oil-soluble initiators which are effective for purposes of polymerization. Representative initiators are well-known in the art and include, for example, thermal initiators that are oil-soluble, such as higher alkyl peroxides or azo compounds or thermal initiators which are water-soluble such as persulfate; redox pairs including sodium sulfite, sodium bisulfite, sodium metabisulfite or sodium formaldehyde sulfoxylate and persulfate salt, ferrous ions and a peroxide (Fenton's reagent), cuprous ions and peroxide, and ferrous ions and sodium persulfate wherein the peroxides can include benzoyl peroxide, hydrogen peroxide, or t-butyl peroxide. Examples of oil-soluble thermal initiators are azobisisobutyronitrile and t-butyl peroctoate. The initiator is employed in an amount sufficient to initiate the polymerization reaction at a desirable rate. In general, the amount of initiator will range from 0.05 to 5, preferably 0.1 to 4 wt %, more preferably from 0.1 to 3 wt %, based on the total amount of the monomers.

In a preferred embodiment, the process of the present invention does not employ a redox pair as an initiator.

Surfactants or emulsifiers suitable for use in the present invention include those conventional surface active agents typically known in the art for polymerization processes. The surfactant(s) can be added to the aqueous phase and/or monomer phase. An effective amount of surfactant in a seeded process is that amount selected to assist in stabilizing the particle as a colloid, minimizing contact between the particles and preventing coagulation. In an unseeded process, an effective amount of surfactant will be that amount selected to influence the particle size.

Representative surfactants include saturated and ethylenically unsaturated sulfonic acids or salts thereof, including, for example, hydrocarbon sulfonic acids, such as, vinyl sulfonic acid, allyl sulfonic acid, and methallyl sulfonic acid, and salts thereof; aromatic hydrocarbon-sulfonic acids, such as, for example, p-styrene sulfonic acid, isopropenyl benzene sulfonic acid, and vinyloxybenzene sulfonic acid, and salts thereof; sulfoalkyl esters of acrylic acid and methacrylic acid, such as, for example, sulfoethyl methacrylate and sulfopropyl methacrylate and salts thereof; and 2-acrylamido-2-methylpropanesulfonic acid and salts thereof; alkylated diphenyl oxide disulfonates, sodium dodecyl benzene sulfonates and dihexyl esters of sodium sulfosuccinic acid, ethoxylated alkyl phenols and ethoxylated alcohols; and sulfosuccinate ester salts, alkylethoxylated sulfate and alkylethoxylated sulfonate salts, alkyl(poly) phosphate salts, and alkyl sulfate and alkyl sulfonate salts.

The type and concentration of surfactant is typically dependent on the polymer solids level and latex particle size. A higher polymer solids level and a low particle size will generally increase the need for surfactant. Typically, surfactants are employed in a total amount of from 0.05 to 20, preferably from 0.05 to 10, more preferably from 0.05 to 5, parts by weight, based on the total weight of the monomers.

Various protective colloids may also be used in place or in addition to the surfactants described above. Suitable colloids include partially acetylated polyvinyl alcohol, casein, hydroxyethyl starch, carboxymethyl cellulose, hydroxyethyl cellulose, hydroxypropyl cellulose and gum arabic. The preferred protective colloids are carboxymethyl cellulose, hydroxyethyl cellulose and hydroxypropyl cellulose. In general, these protective colloids are used at total amounts of 0 to 10, preferably 0 to 5, more preferably 0 to 2 parts by weight, based on the total amount of the monomers.

Various other additives and ingredients known to those skilled in the art can be incorporated to prepare the latex polymer or latex polymer composition of the present invention. Such additives include, for example, metal chelating agents, pH buffering agents, anti-foaming agents, wetting agents, thickeners, plasticizers, fillers, pigments and antioxidants. Known anti-foaming agents include silicon oils, polysiloxane oils, acetylene glycols, mineral oils and paraffinic oils and formulated compounds. Common known wetting agents include alkylphenol ethoxylates, alkali metal dialkyl sulfosuccinates, acetylene glycols and alkali metal alkyl sulfates. Typical thickeners include polyacrylates, polyacrylamides, xanthan gums, modified celluloses or particulate thickeners such as silicas and clays. Typical plasticizers include mineral oil, liquid polybutenes, liquid polyacrylates and lanolin. Zinc oxide, titanium dioxide, aluminum hydrate, calcium carbonate, and clay are typically employed fillers.

In the present invention, the polymerization for producing the polymer latex is preferably started in the presence of hydroperoxide chain transfer agent, and sulfur-containing chain transfer agent is added as the polymerization proceeds. For example, the monomer mixture can be added to the hydroperoxide chain transfer agent or combination of hydroperoxide chain transfer agents, or vice versa. Alternatively, hydroperoxide chain transfer agent can be added to the polymerizing monomer mixture as the polymerization proceeds, preferably in the period of from 3 to 8% of the total polymerization time. In such case, hydroperoxide chain transfer agent is preferably added in the form of an aqueous solution.

The sulfur-containing chain transfer agent or combination of sulfur-containing chain transfer agents is added after the hydroperoxide chain transfer agent, as the polymerization proceeds. The expression "added after the hydroperoxide chain transfer agent" is intended to mean an addition after substantially all of the hydroperoxide chain transfer agent has been introduced in the process, in particular after at least 80 wt %, more particularly at least 90 wt %, even more particularly at least 95 wt %, or at least 99 wt %, or 100 wt % of the hydroperoxide chain transfer agent has been introduced in the process.

The sulfur-containing chain transfer agent or combination of sulfur-containing chain transfer agents is preferably added continuously over at least 20% of the total polymerization time, more preferably over at least 40% of the total polymerization time, even more preferably over at least 60% of the total polymerization time, even more preferably over the total polymerization time.

The total polymerization time, as referred to in this specification, represents the time from contacting the monomer mixture, or a part thereof, with initiator until the desired degree of polymerization is achieved. For example, in case the monomer mixture is continuously added to the reaction as the polymerization proceeds, the total polymerization time represents the time from beginning of the addition until termination of the addition, including the time of subsequent addition of initiator to achieve the desired degree of polymerization.

In general, the polymer latex of the present invention can be prepared by polymerization processes which are known in the art, and particularly by the known latex emulsion polymerization processes, including both seeded and unseeded latex polymerization, provided the addition of the specific chain transfer agents is carried out as described above. Representative processes include those described in U.S. Pat. No. 4,478,974, U.S. Pat. No. 4,751,111, U.S. Pat. No. 4,968,740, U.S. Pat. No. 3,563,946, U.S. Pat. No. 3,575,913, DE 1 905 256 and WO 2011/079011. Such processes can be adapted as necessary to polymerize the monomer mixture used in the present invention. The method of introduction of the monomer mixture and other ingredients, such as polymerization aids, is not particularly critical, except for the addition of the chain transfer agents. The polymerization is then carried out under conventional conditions until the desired degree of polymerization is achieved. Preferably, the polymerization is carried out at a temperature of from 50 to 95° C., more preferably from 70 to 90° C., Crosslinkers and the well-known latex polymerization aids such as initiators, pH buffering agents, surfactants and emulsifiers can be used as needed.

The following examples are given to illustrate the invention and should not be construed as limiting it in any way. Unless stated otherwise, all parts and percentages are given by weight.

EXAMPLES

A series of latexes is prepared by emulsion polymerizing a monomer composition of styrene, butadiene, itaconic acid, acrylic acid and acrylonitrile, in the additional presence of surfactant and persulfate and varying amounts and types of chain transfer agents. The polymerization is carried out as a seeded radical emulsion polymerization with a particle size range of 120 to 140 nanometers (nm) at a temperature of 90° C., similar to the method described in Example 1 of WO 2011/079011.

Gel % test measures gel content and optionally swelling index. The gel content measures the solvent-insoluble fraction of the polymer. The swelling index measures the amount of solvent absorbed by the solvent-insoluble fraction of the polymer. For polymer partly or completely insoluble in solvent (so that the molecular weight cannot be measured by gel permeation chromatography), this technique allows a comparative measure of both molecular weight and cross-linking density of the tested polymers. The higher the Gel %, the higher the crosslinking density network and corresponding molecular weight. When the polymer is produced by emulsion polymerization reaction in which one or more chain transfer agent types are present and when this is the only parameter modified, a high Sell value indicates a low chain transfer efficiency.

For the determination of gel content of the polymer latexes of the present invention, toluene is used as the solvent. Dry films are made from the latexes adjusted to pH 8. A dry latex film having a weight (A) is swollen for 24 hours with toluene. The toluene-insoluble wet gel is then separated by filtration. After drying the wet gel, the weight of the dry gel is determined as (C). Gel % is calculated as:

Gel %=100×(C)/(A)

Elongation at break and force at break reflect polymer film tensile strength. High Gel % polymers (highly cross-linked, with high molecular weight) show a reduced elongation at break and high force at break when subjected to an elongational force. Low Sell polymers films (low cross-linked, with low molecular weight) have the ability to deform under stress but will break at a lower stress.

Tensile strength is tested on film samples of 75 mm length, 10 mm width, with a center part width of 5 mm. The punch press is a NAEF 22/028. Tensile tests are performed according to ASTM D2370-92 using a Houndfield 5000 extensiometer with a crosshead speed of 100 mm/minute.

4-phenylcyclohexene (4-PCH) is a by-product formed by Diels-Alder side reaction competing with emulsion polymerization reaction. The higher the 4-PCH amount, the lower the polymerization reaction conversion and consequently the more Diels-Alder by-products are likely to be formed. In the present invention, the higher the 4-PCH amount, the more the chain transfer agent acts as a polymerization retarder. A given weight of wet latex is extracted for one hour with isooctane. The isooctane extract is injected in a gas chromatography column previously calibrated with standards. Results are given as ppm of impurities based on wet latex.

Examples 1 to 4 (Comparative) and 5 to 8 (in Accordance with the Invention)

Example 1 is prepared in the same manner as described above with 1.7 wt % of tert-dodecyl mercaptan being added continuously over the monomer total feed time.

Example 2 is prepared in the same manner as described above with 4 wt % of tert-butyl hydroperoxide being added continuously over the first 44.5% of the monomer total feed time.

Example 3 is prepared in the same manner as described above with 0.85 wt % of tert-dodecyl mercaptan and 1.4 wt % of tert-butyl hydroperoxide both being added continuously over the monomer total feed time.

Example 4 is prepared in the same manner as described above with 0.85 wt % of tert-dodecyl mercaptan being added continuously during the first 50% of the monomer total feed time and 1.4 wt % of tert-butyl hydroperoxide being added continuously over the last 50% of the monomer total feed time.

Example 5 is prepared in the same manner as described above with 0.85 wt % of tert-dodecyl mercaptan being added continuously during the monomer total feed time and 1.4 wt % of tert-butyl hydroperoxide being added at the start of the emulsion polymerization reaction.

Example 6 is prepared in the same manner as described above with 0.85 wt % of tert-dodecyl mercaptan being added continuously during the monomer total feed time and 1.87 wt % of tert-butyl hydroperoxide being added at the start of the emulsion polymerization reaction.

Example 7 is prepared in the same manner as described above with 1.13 wt % of tert-dodecyl mercaptan being added continuously during the monomer total feed time and 1.4 wt % of tert-butyl hydroperoxide being added at the start of the emulsion polymerization reaction.

Example 8 is prepared in the same manner as described above with 0.85 wt % of tert-dodecyl mercaptan being added continuously during the first 74% of the monomer total feed time and 1.4 wt % of tert-butyl hydroperoxide being added at the start of the emulsion polymerization reaction.

| Latex ref. | % gel/4-PCH %/ppm | Elongation at break/force at break %/N/mm2 |
|---|---|---|
| Example 1 | 81.6-83.4/27 | 357-395*/6-9* |
| Example 2 | 88/169 | 620/5.5 |
| Example 3 | 91/20 | 335*/8* |
| Example 4 | 93.5/12 | 206*/8* |
| Example 5 | 87/36 | 697/5.6 |
| Example 6 | 83/42 | 778/3.6 |
| Example 7 | 82/33 | 562/5 |
| Example 8 | 80/49 | 928/10.4 |

*measurement duplicate for Example 1 and from a separate measurement series for Example 3 and 4 compared to the others The latex polymers of Examples 1 to 8 are formulated into an 80 parts of calcium carbonate and 20 parts of clay formulation at 70 wt % solids and pH 8.5. 8 and 10 wt % of binder levels are used. Each formulation is coated onto a base paper having a weight of 85 g/m² at a coating weight of 12 g/m². The coated papers are evaluated in terms of binding strength as measured by the number of passes to fail in the ink piling test.

The ink piling test simulates coated paper surface picking due to ink tack built up from multiple ink splitting events as paper goes through multiple printing station units during industrial offset printing. Coated paper surface picking results in particles being transferred back to the blanket and printing cylinder where they agglomerate and disturb the printing process and final visual printing appearance. Paper strips of 4.5×26 centimeters are printed on a Prufbau Lab Printing Unit with two printing rolls with a 10 seconds interval between each roll. This allows proper ink deposit on the paper sample. The printing rolls have been previously prepared with a calibrated and controlled standardized Huber ink amount which is uniformly applied on each roll. The paper sample is visually inspected for surface picking and further passed through a vulcanized disk every 5 seconds until picking occurs. The number of passes under the vulcanized disk until picking failure is recorded as the number of passes to fail. The evaluation of the coated papers is summarized in FIG. 1.

The invention claimed is:

1. A process for preparing a polymer latex comprising polymerizing one or more ethylenically unsaturated aromatic monomers and one or more conjugated diene monomers in the presence of hydroperoxide chain transfer agent and sulfur-containing chain transfer agent, wherein the sulfur-containing chain transfer agent is added after at least 80 wt % of the hydroperoxide chain transfer agent has been introduced in the process, as the polymerization proceeds, and wherein the sulfur-containing chain transfer agent is added continuously over at least 20% of the total polymerization time.

2. The process according to claim 1, wherein the hydroperoxide chain transfer agent is an organic hydroperoxide.

3. The process according to claim 1, wherein the sulfur-containing chain transfer agent is an alkyl mercaptan.

4. The process according to claim 1, wherein 0.5 to 10 parts by weight of hydroperoxide chain transfer agent and 0.1 to 10 parts by weight of sulfur-containing chain transfer agent is used, based on 100 parts by weight of the total amount of monomers.

5. The process according to claim 1, wherein
   (A) 10 to 90 wt % of one or more ethylenically unsaturated aromatic monomers,
   (B) 10 to 80 wt % of one or more conjugated diene monomers,
   (C) 0 to 70 wt % of one or more acrylate monomers, and
   (D) the remaining amount of one or more polymerizable comonomers are polymerized, with the sum of the amount of the monomers (A), (B), (C), and (D) being 100 wt %.

6. The process according to claim 5, wherein the (A) monomers are styrene and the (B) monomers are 1,3-butadiene.

7. The process according to claim 5, wherein the monomer (D) includes acrylonitrile.

8. The process according to claim 1, wherein the polymerization is carried out at a temperature of from 50 to 95° C.

9. The process according to claim 1, wherein the polymerization is an emulsion polymerization.

* * * * *